(12) United States Patent
Gupta et al.

(10) Patent No.: US 9,518,213 B2
(45) Date of Patent: *Dec. 13, 2016

(54) NANO-DISPERSION WELL SERVICING FLUID CONTAINING A PH ADJUSTER

(71) Applicant: BAKER HUGHES INCORPORATED, Houston, TX (US)

(72) Inventors: D. V. Satyanarayana Gupta, The Woodlands, TX (US); Kay Elaine Cawiezel, Fulshear, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,504

(22) Filed: Jul. 9, 2015

(65) Prior Publication Data

US 2015/0307771 A1 Oct. 29, 2015

Related U.S. Application Data

(62) Division of application No. 12/790,577, filed on May 28, 2010, now Pat. No. 9,080,097.

(51) Int. Cl.
| | |
|---|---|
| *E21B 43/10* | (2006.01) |
| *C09K 8/66* | (2006.01) |
| *C09K 8/68* | (2006.01) |
| *C09K 8/84* | (2006.01) |
| *C09K 8/80* | (2006.01) |

(52) U.S. Cl.
CPC ............... *C09K 8/665* (2013.01); *C09K 8/68* (2013.01); *C09K 8/685* (2013.01); *C09K 8/80* (2013.01); *C09K 8/845* (2013.01); *C09K 2208/10* (2013.01)

(58) Field of Classification Search
CPC ............. C09K 8/665; C09K 8/68; C09K 8/45; C09K 8/685; C09K 2208/10; E21B 43/10
USPC .......................... 166/305.1, 268, 280.1, 300
See application file for complete search history.

(56) References Cited

U.S. PATENT DOCUMENTS

| | | | |
|---|---|---|---|
| 5,226,479 | A | 7/1993 | Gupta et al. |
| 6,983,801 | B2 | 1/2006 | Dawson et al. |
| 7,028,771 | B2 | 4/2006 | Smith et al. |

(Continued)

FOREIGN PATENT DOCUMENTS

CA 2702539 7/2009

OTHER PUBLICATIONS

Wikipedia "Zirconium dioxide" obtained from http://en.wikipedia.org/wiki/zirconia, Jun. 1, 2010, pp. 1-4.

(Continued)

*Primary Examiner* — Doug Hutton, Jr.
*Assistant Examiner* — Silvana Runyan
(74) *Attorney, Agent, or Firm* — Parsons Behle & Latimer

(57) ABSTRACT

A nano-dispersion well servicing fluid is disclosed. The well servicing fluid is formulated with components comprising: nanoparticles comprising at least one material chosen from aluminum oxides, aluminum hydroxides, aluminum hydroxyoxides, zirconium oxides, zirconium hydroxides, zirconium hydroxyoxides, wherein the concentration of nanoparticles is greater than 0.5% by weight based on the total weight of the nano-dispersion well servicing fluid. The well servicing fluid also comprises an aqueous base continuous phase. Methods of employing the nano-dispersion to service a wellbore are also disclosed.

18 Claims, 9 Drawing Sheets

(56) References Cited

U.S. PATENT DOCUMENTS

| | | | |
|---|---|---|---|
| 2003/0103121 A1 | 6/2003 | Tomioka et al. | |
| 2003/0114315 A1 | 6/2003 | Schwartz et al. | |
| 2003/0220204 A1 | 11/2003 | Baran, Jr. et al. | |
| 2006/0154829 A1 | 7/2006 | Smith et al. | |
| 2006/0177661 A1 | 8/2006 | Smith et al. | |
| 2007/0173414 A1 | 7/2007 | Wilson, Jr. | |
| 2008/0051302 A1* | 2/2008 | Crews | C09K 8/602 507/271 |
| 2008/0058229 A1 | 3/2008 | Berkland et al. | |
| 2008/0060812 A1 | 3/2008 | Huang et al. | |
| 2008/0115930 A1 | 5/2008 | Peters et al. | |
| 2008/0277116 A1 | 11/2008 | Roddy et al. | |
| 2009/0082230 A1 | 3/2009 | Javora et al. | |
| 2009/0314549 A1 | 12/2009 | Chenevert et al. | |
| 2010/0096139 A1* | 4/2010 | Holcomb | C09K 8/536 166/308.1 |

OTHER PUBLICATIONS

Wikipedia "Zeta Potential" obtained from http://en.wikipedia.org/wiki/zeta_potential, Apr. 12, 2010, pp. 1-5.

US Patent and Trademark Office, Office Action dated Aug. 20, 2012, issued in U.S. Appl. No. 12/790,577.

Colombia Patent Office; Office Action dated Oct. 17, 2013, issued in Colombia Patent Application No. 12-226.094.

European Patent Office, Office Action dated Sep. 20, 2013, issued in European Patent Application No. 11717448.2.

IP Australia; Patent Examination Report No. 1, dated Apr. 16, 2013, issued in Australian Patent Application No. 2011258773.

Canadian Intellectual Property Office; Office Action dated Dec. 17, 2013, issued in Canadian Patent Application No. 2,800,873.

US Patent and Trademark Office; Final Office Action dated Dec. 19, 2012, issued in U.S. Appl. No. 12/790,577.

US Patent and Trademark Office; Office Action dated Sep. 27, 2013, issued in U.S. Appl. No. 12/790,577.

US Patent and Trademark Office; Office Action dated Mar. 19, 2014, issued in U.S. Appl. No. 12/790,577.

US Patent and Trademark Office; Office Action dated Nov. 19, 2014, issued in U.S. Appl. No. 12/790,577.

International Searching Authority; International Search Report and Written Opinion dated Jul. 21, 2011 issued in PCT/US2011/034440.

* cited by examiner

NANO-DISPERSION WELL SERVICING FLUID CONTAINING A PH ADJUSTER

This application is a divisional of U.S. patent application Ser. No. 12/790,577, filed May 28, 2010, issued as U.S. Pat. No. 9,080,097, and entitled "Well Servicing Fluid," which is herein incorporated by reference.

FIELD OF THE DISCLOSURE

The present disclosure relates generally to a well servicing fluid, and more particularly to a servicing fluid that comprises nanoparticles.

BACKGROUND

Hydraulic fracturing is a common stimulation technique used to enhance production of fluids from subterranean formations in, for example, oil, gas, coal bed methane and geothermal wells. In a typical hydraulic fracturing treatment operation, a viscosified fracturing fluid is pumped at high pressures and high rates into a wellbore penetrating a subterranean formation to initiate and propagate a hydraulic fracture in the formation. Subsequent stages of viscosified fracturing fluid containing particulate matter known as proppant, e.g., graded sand, ceramic particles, bauxite, or resin coated sand, are then typically pumped into the created fracture. The proppant becomes deposited into the fractures, forming a permeable proppant pack. Once the treatment is completed, the fracture closes onto the proppant pack, which maintains the fracture and provides a fluid pathway for hydrocarbons and/or other formation fluids to flow into the wellbore.

The fracturing fluid is usually a water-based fluid containing a gelling agent, e.g., a polymeric material that absorbs water and forms a gel as it undergoes hydration. The gelling agent serves to increase the viscosity of the fracturing fluid. The increased viscosity provides a number of advantages, including, among other things, improving the fracture propagating ability of the fluid and enabling the fracturing fluid to suspend and carry effective amounts of proppant.

While polymers have been used in the past as gelling agents in fracturing fluids, such polymers often tend to leave a coating on the proppant even after the gelled fluid is broken. The coating can interfere with the functioning of the proppant. Studies have also shown that "fish-eyes" and/or "microgels" present in some polymer gelled carrier fluids will plug pore throats, leading to impaired leakoff and potentially causing formation damage. Conventional polymers are also generally either cationic or anionic, which can also potentially damage the formation.

Aqueous fracturing fluids gelled with viscoelastic surfactants (VES) are also known in the art. VES-gelled fluids have been widely used as fracturing fluids because they exhibit excellent rheological properties and are less damaging to producing formations than crosslinked polymer fluids. VES fluids are non-cake-building fluids, and thus leave little or no potentially damaging polymer cake residue. However, the same property that makes VES fluids less damaging tends to result in significantly higher fluid leakage into the reservoir matrix, which can reduce the efficiency of the fluid, especially during VES fracturing treatments.

Another fluid known as a gravel packing fluid having relatively large grained sand, e.g., gravel, suspended therein also may be utilized to prevent migration of smaller grained sand from the subterranean formation into the well bore and to maintain the integrity of the formation. In particular, a permeable screen may be placed against the face of the subterranean formation, followed by pumping the gravel packing fluid into the annulus of the well bore such that gravel becomes packed against the exterior of the screen.

While advances have been made in well servicing fluids, further improvements in well servicing fluids would be a welcome addition in the field.

SUMMARY

The well servicing fluids of the present disclosure can provide one or more of the following advantages: shear thinning properties suitable for transporting proppant; high/low shear viscosity suitable for transporting proppant; improved fluid loss control, reduced damage to the formation, improved clay stabilization, reduced potential for emulsion formation compared to some VES fluids, reduced likelihood of altering the wettability of the formation compared some VES fluids, improved leak off control compared to some VES fluids and improved ability to maintain viscosity at elevated temperatures.

An embodiment of the present disclosure is directed to a nano-dispersion well servicing fluid. The well servicing fluid is formulated with components comprising: nanoparticles comprising at least one material chosen from aluminum oxides, aluminum hydroxides, aluminum hydroxyoxides, zirconium oxides, zirconium hydroxides, zirconium hydroxyoxides, wherein the concentration of nanoparticles is greater than 0.5% by weight based on the total weight of the nano-dispersion well servicing fluid; and an aqueous base continuous phase.

Another embodiment of the present disclosure is directed to a method of servicing a wellbore. The method comprises forming a nano-dispersion well servicing fluid by blending an aqueous base continuous phase and nanoparticles comprising at least one material chosen from aluminum oxides, aluminum hydroxides, aluminum hydroxyoxides, zirconium oxides, zirconium hydroxides, and zirconium hydroxyoxides. The concentration of nanoparticles is greater than 0.5% by weight based on the total weight of the nano-dispersion well servicing fluid. The well servicing fluid is introduced into the wellbore.

Figure 1:
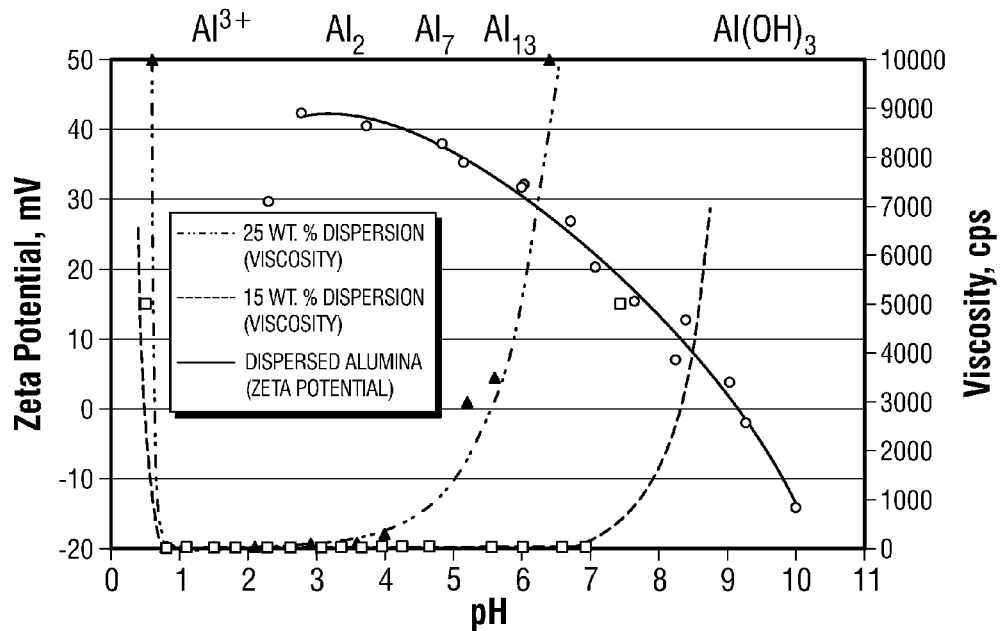
FIG. 1 is a graph showing the change in Zeta potential with pH for 15 and 25% alumina concentrations, as described more fully in the Examples set forth in the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to a well servicing fluid for use in various applications, such as fracturing and gravel pack operations. The well servicing fluid is formulated with components comprising nanoparticles comprising at least one material chosen from aluminum oxides, aluminum hydroxides, aluminum hydroxyoxides, zirconium oxides, zirconium hydroxides and zirconium hydroxyoxides; and an aqueous base continuous phase. Optionally, a proppant can be added to the fluid.

Nanoparticles

The nanoparticles can comprise any type of aluminum oxides, hydroxides or hydroxyoxides. Examples include $Al_2O_3$ and Boehmite. Other suitable materials include zirconium oxides and hydroxides, such as zirconia. In an embodiment, the nanoparticles comprise boehmite. The nanoparticles can have a concentration of aluminum oxides, hydroxides and hydroxyoxides or zirconium oxides, hydroxides and hydroxyoxides of greater than 50% by weight of the total weight of the nanoparticles.

The nanoparticles can vary in size depending on whether they are dispersed in the fluid so as to provide viscosification, or whether they remain in a crystallized form that does not provide viscosification. The crystallized size is generally smaller than the dispersed size. The crystallized size, prior to being dispersed in the fluid, can be any suitable size that will result in the desired viscosification of the fluid after dispersion. For example, the crystallized size can be less than 100 nm in diameter, such as about 5 to about 50 nm, or about 9 nm to about 25 nm in diameter. The dispersed size can range from about 50 to about 500 nanometers in diameter, such as about 100 to about 250 nm. Sizes outside of these ranges can also be employed.

The concentration of nanoparticles in the well servicing fluid can be any suitable amount that will provide the desired viscosification. In an embodiment, the concentration is greater than 0.5% (about 41.7 pounds per thousand gallons ("pptg")) by weight based on the total weight of the nanodispersion well servicing fluid. For example, the concentration of nanoparticles can range from about 2% to about 20% by weight (about 167 pptg to about 1670 pptg). Concentrations outside of these ranges can also be employed if they provide the desired viscosification.

Aqueous Base

Any suitable aqueous base can be employed. Examples of suitable aqueous base include fresh water, brine, produced water, and combinations thereof.

The brine may be any brine that serves as a suitable media for the various components. As a matter of convenience, in some cases the brine base fluid may be the brine available at the site used in the completion fluid, for example. The brines may be prepared using salts including, but not limited to, NaCl, KCl, $CaCl_2$, $MgCl_2$, $NH_4Cl$, $CaBr_2$, NaBr, $ZnBr_2$, sodium formate, potassium formate, cesium formate and any other stimulation and completion brine salts. In an embodiment, the brine is seawater.

The concentration of the salts in the brines can range from about 0.5% by weight of the brine up to saturation for a given salt. Example concentrations of salts include 2%, 10%, 20%, 30% or more salt by weight of water. The brine may be a combination of one or more of the mentioned salts, such as, for example, a brine prepared using NaCl and $CaCl_2$ or NaCl, $CaCl_2$, and $CaBr_2$.

Proppants and Other Ingredients

Proppants can be mixed with the well servicing fluids of the present disclosure. Any suitable proppant can be employed. Examples of suitable proppant includes graded sand, glass or ceramic beads or particles, sized calcium carbonate and other sized salts, bauxite grains, resin coated sand, walnut shell fragments, aluminum pellets, nylon pellets, and combinations of the above.

Proppants are well known to be used in concentrations ranging from about 0.05 to about 14 pounds per gallon (about 6 to about 1700 kg/m) of fracturing fluid composition, but higher or lower concentrations can be used as desired for the particular fracture design.

The well servicing fluid can comprise at least one additional compound chosen from breakers capable of reducing the viscosity of the fluid, water wetting surfactants, non-emulsifiers, additional viscosifying agents, additional surfactants, clay stabilization additives, scale dissolvers, biopolymer degradation additives, fluid loss control additives, high temperature stabilizers, and other common and/or optional components.

In an embodiment, the well servicing fluids of the present disclosure do not comprise a viscoelastic surfactant ("VES") gelling agent in an amount effective to significantly increase the viscosity of the fluid. For example, the well servicing fluids can comprise substantially no VES gelling agent. Examples of VES gelling agents include those discussed in U.S. Patent Application Publication No. 2008/0060812, published Mar. 13, 2008, the disclosure of which is hereby incorporated by reference in its entirety.

The nanoparticles employed in the present disclosure carry a charge that results in an electric potential in the dispersion, otherwise known as Zeta potential. The use and measurement of Zeta potential is well known for characterizing dispersions. All values for Zeta potential in the present disclosure are in units of millivolts, unless otherwise stated.

The Zeta potential of the dispersions of the present disclosure can be varied in order to control the viscosity of the well servicing fluid. The viscosity of the fluid increases with decreasing Zeta potential. FIG. 1 illustrates correlations in Zeta potential with pH and viscosity for example formulations comprising 15% and 25% by weight Boehmite. Increases in viscosity vary depending on, among other things, the type and concentration of nanoparticles in the fluid. As shown in FIG. 1, for the 25 wt. % concentration of Boehmite, the viscosity increases from about one to about 10,000 cps as the pH increases from about 2.5 to about 6. The corresponding Zeta potential decreases from about 42 to about 26 for this same change in viscosity. For the 15 wt. % concentration, the viscosity increases from about one about 7000 cps as the pH increases from about 6.7 to about 9. The corresponding Zeta potential decreases from about 24 to about 5 for this same change in viscosity.

By choosing the type and concentration of nanoparticles, one of ordinary skill in the art can control the workable range of pH and workable range of Zeta potentials over which a desired viscosity range can be achieved. The viscosity can then be controlled by increasing or decreasing the Zeta potential within the workable range. Any suitable technique for controlling pH and/or Zeta potential can be employed.

Examples of suitable methods for adjusting Zeta potential of the fluids include controlling the pH of the fluid and adding surfactants and/or esters to the fluid. Controlling the pH can be performed by adding a pH adjuster to the well servicing fluid. Examples of pH adjusters include commonly used acids and bases, buffers and mixtures of acids and bases. For example, caustic (e.g., NaOH, KOH or $Ca(OH)_2$), sodium bicarbonate, potassium carbonate, and sodium carbonate can be employed. Examples of acids that can be used include hydrochloric acid, acetic acid, citric acid, formic acid, fumaric acid, and sulfamic acid. The range of pH of the fluid can be any suitable range, such as about 2 to about 14.

Examples of suitable esters that can also be employed to shift the Zeta potential include esters of polycarboxylic acid, such as an ester of oxalic, malonic, succinic, malic, tartaric, citric, phthalic, ethylenediamine tetraacetic (EDTA), nitrilotriacetic and other carboxylic acids. Examples of a suitable ester compounds include citrates, such as acetyl triethyl citrate, oxalates, and ethylenediamine tetraacetates, as described in U.S. Pat. No. 6,983,801, issued Jan. 10, 2006 to Dawson et al., the disclosure of which is hereby incorporated by reference in its entirety. Esters are known for providing a delayed reduction in viscosity due to the relatively slow hydrolysis of the ester. The products of hydrolysis include polycarboxylate anions that can affect the ionic strength and/or pH of the fluid, and thereby shift the Zeta potential back to provide a desired reduced viscosity.

Any other suitable pH adjusters that can react slowly with water to produce acid, where the reaction occurs slowly enough to provide a suitable delay, can also be employed. In addition to esters, such compounds can include acid anhydrides and lactones, such as 4,4'-oxydiphthalic anhydride and γ-butyrolactone. Polymeric acid anhydrides and polymeric hydroxycarboxlic acids are also useful. These examples of pH adjusters may be suitable for use with, for example, high pH borate cross-linked hydroxypropyl gaur gum-based fracturing fluids that include an enzyme component comprised of cellulose. A discussion of these other suitable pH adjusters is found in U.S. Pat. No. 5,226,479, issued to Gupta et. al., the disclosure of which is hereby incorporated by reference in its entirety. The suitable pH adjuster useful in practice and its concentrations can be dependent on, among other things, the temperature of the formation and the rate of breaking desired.

Suitable surfactants can include any non-ionic, anionic, cationic or amphoteric surfactants that change the Zeta potential. In an embodiment, these surfactants are not viscoelastic surfactants, such as the viscoelastic surfactants described in U.S. Patent Application Publication No. 2008/0051302, published Feb. 28, 2008, the disclosure of which is hereby incorporated by reference in its entirety. Examples of suitable surfactants include those disclosed in U.S. Patent Application Publication No. 2003/0114315, published on Jun. 19, 2003, the disclosure of which is hereby incorporated by reference in its entirety.

Examples of suitable anionic surfactants include alkyl, aryl or alkyl aryl sulfates, alkyl, aryl or alkyl aryl carboxylates or alkyl, aryl or alkyl aryl sulfonates. In an embodiment, the alkyl moieties can have about 1 to about 18 carbons, the aryl moieties can have about 6 to about 12 carbons, and the alkyl aryl moieties can have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates. Examples include alkyl ether sulphates, alkaryl sulphonates, alkyl succinates, alkyl sulphosuccinates, N-alkoyl sarcosinates, alkyl phosphates, alkyl ether phosphates, alkyl ether carboxylates, alpha-olefin sulphonates and acyl methyl taurates, such as their sodium, magnesium ammonium and mono-, di- and triethanolamine salts. The alkyl and acyl groups can contain, for example, from 8 to 18 carbon atoms and can be unsaturated. The alkyl ether sulphates, alkyl ether phosphates and alkyl ether carboxylates can contain, for example, from one to 10 ethylene oxide or propylene oxide units per molecule, such as 2 to 3 ethylene oxide units per molecule. Examples of suitable anionic surfactants include sodium lauryl sulphate, sodium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauroyl isethionate, and sodium N-lauryl sarcosinate.

Examples of suitable cationic surfactants include, for example, quaternary ammonium surfactants of the formula $X^-N^+R^1R^2R^3$ where $R^1$, $R^2$, and $R^3$ are independently selected from hydrogen, an aliphatic group of from about 1 to about 22 carbon atoms, or aromatic, aryl, an alkoxy, polyoxyalkylene, alkylamido, hydroxyalkyl, or alkylaryl groups having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate. The aliphatic groups may contain, in addition to carbon and hydrogen atoms, ether linkages, and other groups such as hydroxy or amino group substituents (e.g., the alkyl groups can contain polyethylene glycol and polypropylene glycol moieties). The longer chain aliphatic groups, e.g., those of about 12 carbons, or higher, can be saturated or unsaturated. In an embodiment, $R^1$ is an alkyl group having from about 12 to about 18 carbon atoms; $R^2$ is selected from H or an alkyl group having from about 1 to about 18 carbon atoms; $R^3$ and $R^4$ are independently selected from H or an alkyl group having from about 1 to about 3 carbon atoms; and X is as described above.

Other examples of surfactants can include betaines, sultaines and hydroxysultaines, or amine oxides. Examples of betaines include the higher alkyl betaines, such as coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2-hydroxyethyl)carboxymethyl betaine, oleyl dimethyl gamma-carboxypropyl betaine, lauryl bis-(2-hydroxypropyl)alpha-carboxyeth-yl betaine, coco dimethyl sulfopropyl betaine, lauryl dimethyl sulfoethyl betaine, lauryl bis-(2-hydroxyethyl)sulfopropyl betaine, amidobetaines and amidosulfobetaines (wherein the $RCONH(CH_2)_3$ radical is attached to the nitrogen atom of the betaine, oleyl betaine, and cocamidopropyl betaine. Examples of sultaines and hydroxysultaines include materials such as cocamidopropyl hydroxysultaine.

Therefore, as discussed above, by employing the nanoparticles of the present disclosure the viscosity can be increased for fracturing, gravel pack applications, or other applications. The viscosity can also be reduced after the fracturing or gravel pack applications are completed by shifting the pH to a reduced value, thereby increasing the Zeta potential. This can be accomplished by adding a pH adjustor to the well when it is desired to break the viscosified well servicing fluid; or by including an ester in the well servicing fluid that provides a delayed shift in the Zeta potential, thereby reducing the viscosity and breaking the well servicing fluid. Alternatively, other breaker compounds can be included in the well servicing fluid, including breaker compounds that are well known in the art.

Different formations can have different needs in terms of the optimum viscosity and sheer thinning properties of the well servicing fluid. The ability to adjust Zeta potential and thereby match the viscosity of the fluid to best suit the needs of a given formation has been a marketing push based on coacervation chemistry, as described in U.S. Patent App 2003/0114315, the disclosure of which is hereby incorporated by reference in its entirety. The ability to adjust the viscosity of a well servicing fluid by shifting the Zeta potential using nanoparticles, as described herein, can also allow tailoring of the viscosity in order to provide the desired well servicing fluid properties best suited for any given formation.

Modifying the pH to vary the Zeta potential of the well servicing fluid of the present disclosure can also be employed to increase the contact angle and reduce interfacial tension between the well servicing fluid and the formation. Increasing the contact angle can make it easier to recover the fluid after fracturing and/or gravel packing is complete. In the past, reducing the surface tension has been accomplished by adding surfactant, which sometimes also lowers contact angle. Microemulsion surfactants have been used to lower the surface tension and increase the contact angle in the industry. However, in the present disclosure, additional surfactant may not be necessary to lower the surface tension if the surface tension is relatively low and the contact angle is sufficiently high to accomplish the desired fluid recovery by simply adjusting the pH. Alternatively, surfactant can be employed in addition to or instead of adjusting pH to lower the surface tension and increase the contact angle.

Any suitable process for mixing the nanoparticles, aqueous base, proppant and other ingredients to form the well servicing fluid can be used. For example, after the nanoparticles are added to a certain amount of aqueous base to form the well servicing fluid, the well servicing fluid can be pumped into the well as clean fluid and/or proppant are added to the fracture fluid. Alternatively, some or all of the other ingredients and/or proppant can be added prior to or simultaneously with the nanoparticles to form the well servicing fluid.

The present disclosure is also directed to a method of servicing a wellbore. The method comprises forming a nano-dispersion well servicing fluid by blending an aqueous based continuous phase and nanoparticles. Any aqueous base and nanoparticles discussed above for use in the present disclosure can be employed. As also discussed above, the concentration of nanoparticles can be sufficient to provide the desired viscosity, such as concentrations greater than 0.5% by weight based on the total weight of the nano-dispersion well servicing fluid. Any suitable additional ingredients can also be added. The resulting well servicing fluid can be introduced into the wellbore.

The well servicing fluid can be formulated to have a first viscosity when it is introduced into the wellbore. Subsequently, the Zeta potential of the fluid can be adjusted to in turn adjust the viscosity from the first viscosity to a second desired viscosity. The Zeta potential can be adjusted by any suitable technique discussed herein. In one embodiment, where the well servicing fluid has a first pH when introduced into the well, a pH adjuster is added to the wellbore in an amount sufficient to change the pH of the well servicing fluid from the first pH to a second pH. Alternatively, the Zeta potential of the fluid can be adjusted by adding a surfactant or an ester to the fluid prior to or simultaneous with introducing the fluid into the wellbore.

In an embodiment, the well servicing fluid is introduced as a fracturing fluid or gravel pack fluid into a wellbore. The well servicing fluid can be introduced using any suitable technique. Various techniques for fracturing and gravel packing wells are well known in the art.

While the fluids are described herein as having use in fracturing fluids and as gravel pack fluids, it is expected that the fluids of the present disclosure will find utility in completion fluids, fluid loss pills, lost circulation pills, diverter fluids, foamed fluids, stimulation fluids and the like.

The present disclosure will be further described with respect to the following Examples, which are not meant to limit the invention, but rather to further illustrate the various embodiments.

EXAMPLES

Nanoparticle Material

The following examples were formulated with a mineral form of hydroxyoxide of aluminum called Boehmite, which is commonly known as alumina monohydrate—$Al_2O_3.H_2O$. In particular, the following commercial forms of Boehmite were used, and will be referred to throughout the examples:
a) Catapal 200 Alumina—Dispersed particle Size is 90 nm
b) Dispal 11N4-80—Dispersed particle Size is 225 nm
c) Dispal14N4-80—Dispersed particle Size is 120 nm
d) Dispal18N4-80—Dispersed particle Size is 110 nm
e) Dispal23N4-80—Dispersed particle Size is 90 nm
f) Dispal 14HP For formulations using the Catapol Alumina, 1 meqacid/gram aluminum oxide was used to disperse the nanoparticles. The Dispal Alumina is a dispersible alumina pretreated with acid to help dispersion.

Formulations and Test Procedures
Formulation 1:
Tomball tap water,
15% Catapal 200 Alumina—tested from pH 6 to 8 in increments of 0.5
Formulation 2:
Tomball tap water,
5% Catapal 200 Alumina—tested from pH 6.5 to 10 in increments of 0.5

Example Formulations 1 and 2 were prepared by mixing using a standard Servodyne overhead mixer. The alumina was added to the water and then pH was adjusted with 25% Caustic. At each pH value tested, gel viscosity was measured on an OFITE M900 using a R1B1 rotor-bob configuration @ 1, 3, 6, 10, 30, 60, 100, 300, and 600 RPM's.

Formulation 3:
Tomball tap water,
5% Catapal 200 Alumina.
25% Caustic to pH 9.5
Formulation 4:
Tomball tap water,
10% Catapal 200 Alumina,
25% Caustic to pH 9.5
Formulations 5A to 5D:
Tomball tap water,
10% Alumina (Sample types 5A to 5D below),
25% Caustic to pH 9.5
Alumina samples tested for formulations 5A to 5D included:
  5A) 14N4-80
  5B) 18N4-80
  5C) 23N4-80
  5D) Dispal 14HP
Formulations 6A to 6E:
Tomball tap water,
5% Alumina, (Sample types 6A to 6D below),
25% Caustic to pH 9.5
Alumina samples tested for formulations 6A to 6E included:
  6A) 11N 4-80
  6B) 14N4-80
  6C) 18N4-80

6D) 23N4-80
6E) Dispal 14HP
Formulation 7:
Tomball tap water,
5% Alumina 23N4-80,
50% KOH to pH 9.5
Formulation 8:
Tomball tap water,
5% Alumina 23N4-80,
25% Ca(OH)$_2$ to pH 8.23 and 9.74
Formulation 9:
Tomball tap water,
5% Alumina 11N4-80
25% Ca(OH)$_2$ to pH 9.74

Example Formulations 3 to 9 were prepared by mixing using a standard Servodyne overhead mixer. The alumina was added to the water and then the pH was adjusted to pH 9.5. Testing for each of Formulations 3 to 9 was then carried out using the Fann 50 and Chandler 5550 rheometers, as follows.

In the Fann 50 testing, the fluid was initially sheared at 100 s$^{-1}$ followed by a shear rate sweep of 100, 80, 60, and 40 s$^{-1}$ to calculate the power law indices n' and K'. The fluid was sheared at 100 s$^{-1}$ in between shear rate sweeps and the shear rate sweep was repeated every 30 minutes. A R1B5 rotor-bob configuration was used. The fluid system was tested at 75° F. for the first 30 minutes followed by a temperature ramp of 150-350° F. with temperature increasing 50° F. every 30 minutes.

In Chandler 5500 testing, the fluid was initially sheared at 100 sec$^{-1}$ followed by a shear rate sweep of 100, 80, 60, and 40 s$^{-1}$ to calculate the power law indices n' and K'. The fluid was sheared at 100 s$^{-1}$ in between shear rate sweeps and the shear rate sweep was repeated every 30 minutes. A R1B5 rotor-bob configuration was used. The fluid system was tested at 75° F. for the first 30 minutes followed by a temperature ramp of 150-450° F. with temperature increasing 50° F. every 30 minutes.

In OFITE M900 testing for formulations 3 to 9, the fluid viscosity was checked at 300 RPM (a shear rate of 511 s$^{-1}$).

Results of Viscosity Testing

Figure 2:
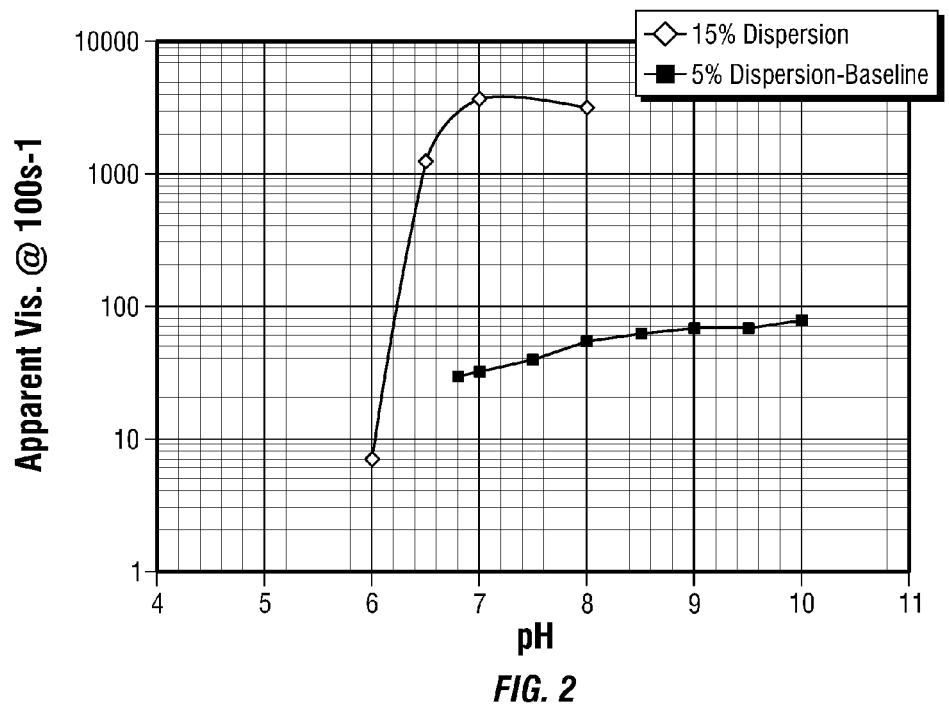
FIGS. 2 to 9 are graphs of data showing the results of testing, as described more fully in the Examples set forth in the present disclosure.

Initial viscosity testing with a 15% dispersion of Catapal 200 Alumina (Formulation 1) and a 5% dispersion of Catapal 200 Alumina (Formulation 2) suggested that a significant increase in viscosity could be observed by increasing the pH of the dispersion. FIG. 2 shows the change in viscosity of the 5% and 15% alumina dispersions by adjusting the pH with sodium hydroxide.

Figure 3:
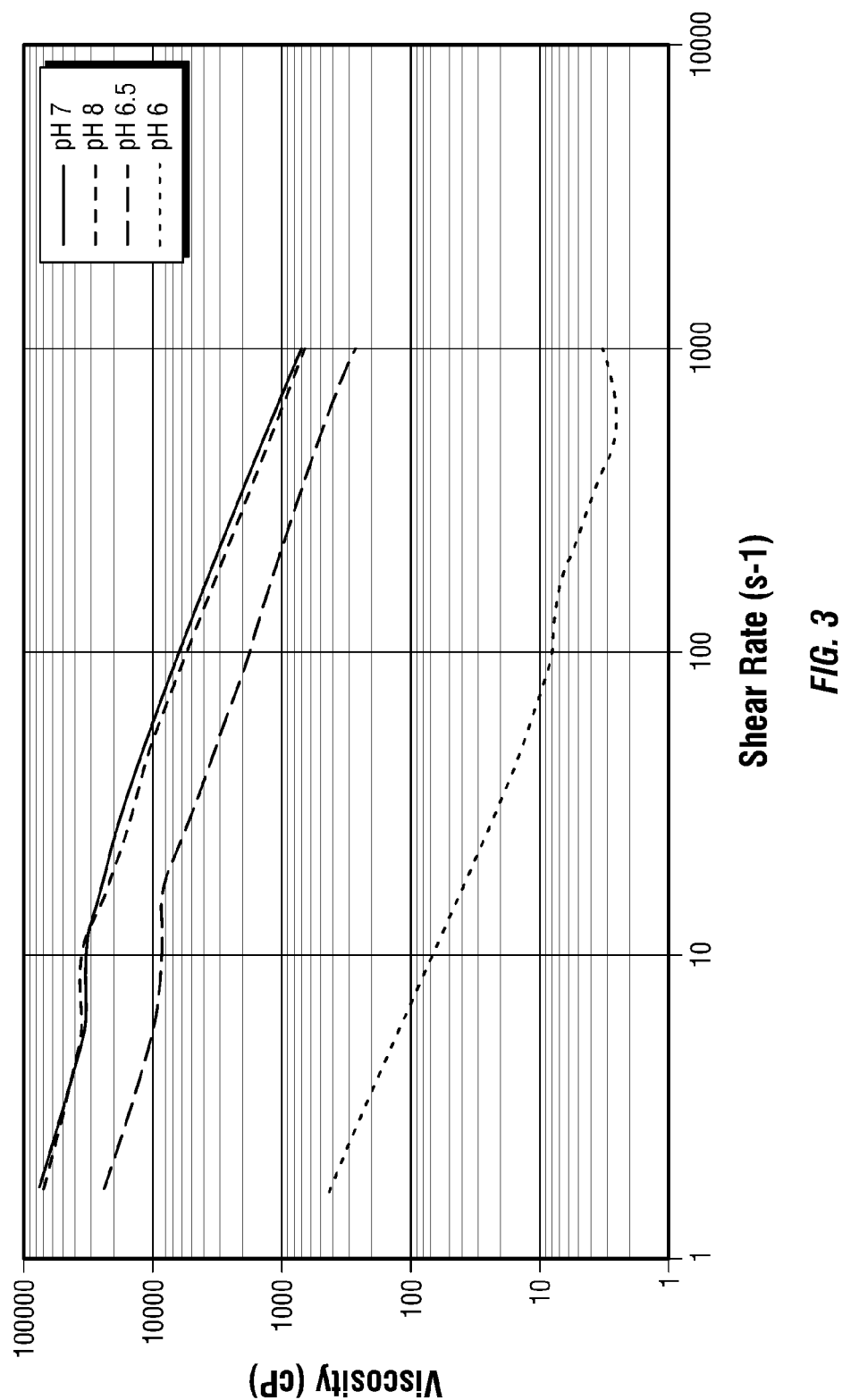

Testing with the 15% dispersion of Catapal 200 Alumina suggested that the increase in viscosity due to increased pH was minimal above a pH of 7. The fluid viscosity at pH 7 was approximately 4,000 cP at 100 s$^{-1}$. See FIGS. 2 and 3.

Figure 4:
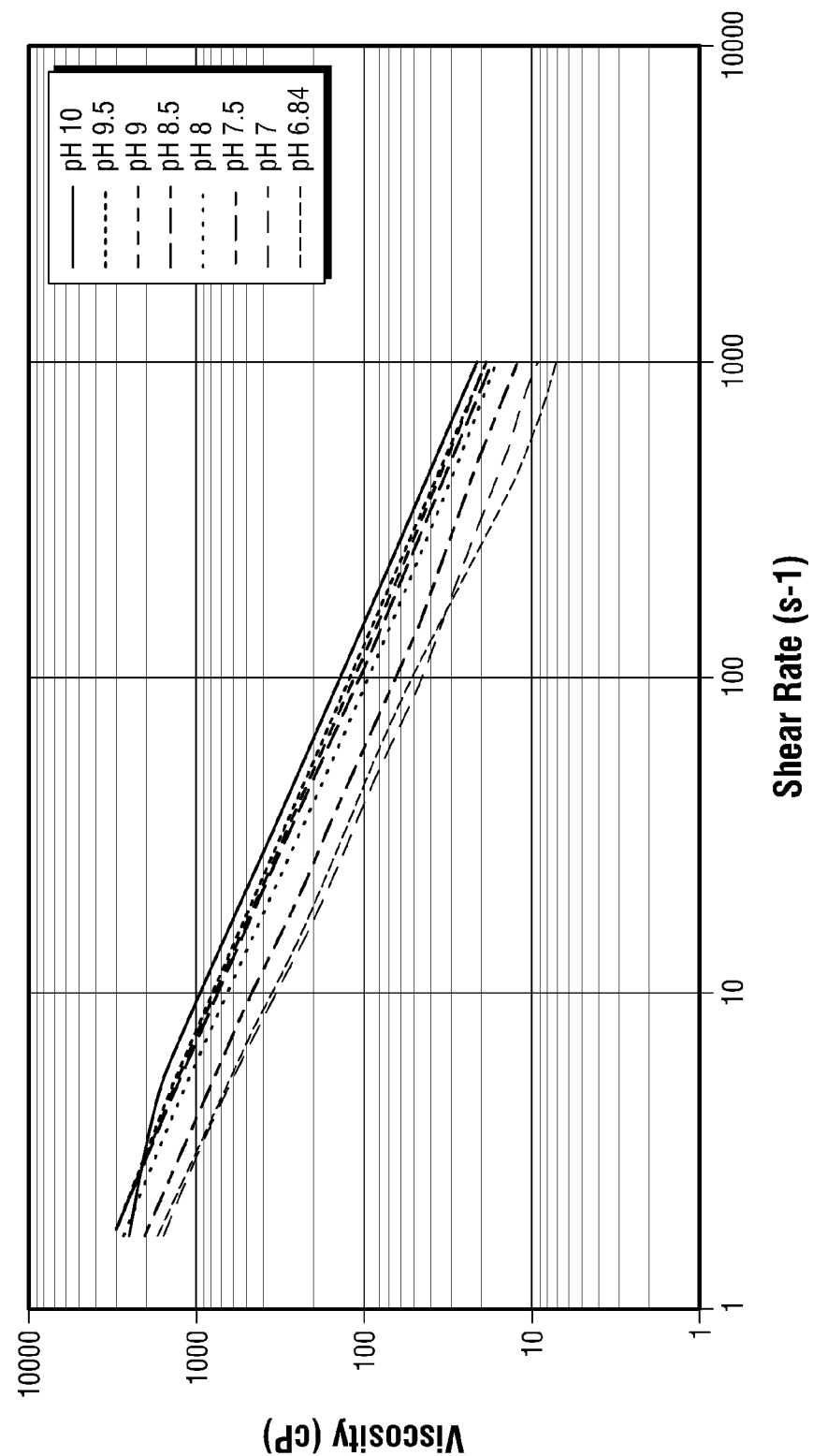

Testing with the 5% dispersion of Catapal 200 Alumina suggested that the increase in viscosity due to increased pH slowed as the pH increased from 8 to 10. The fluid viscosity at pH 10 was approximately 80 cP at 100 s$^{-1}$. See FIGS. 2 and 4.

Figure 5A:
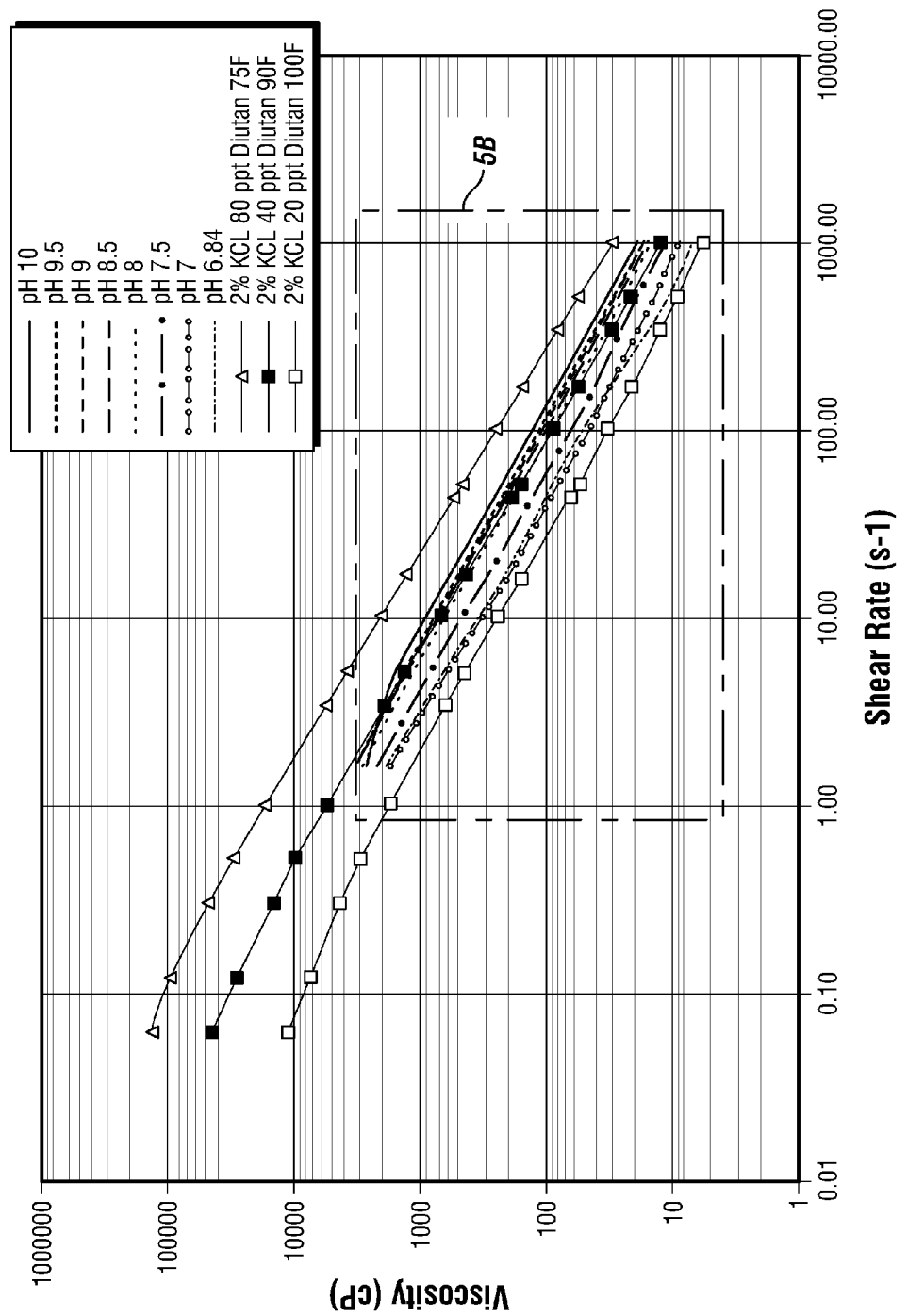
Figure 5B:
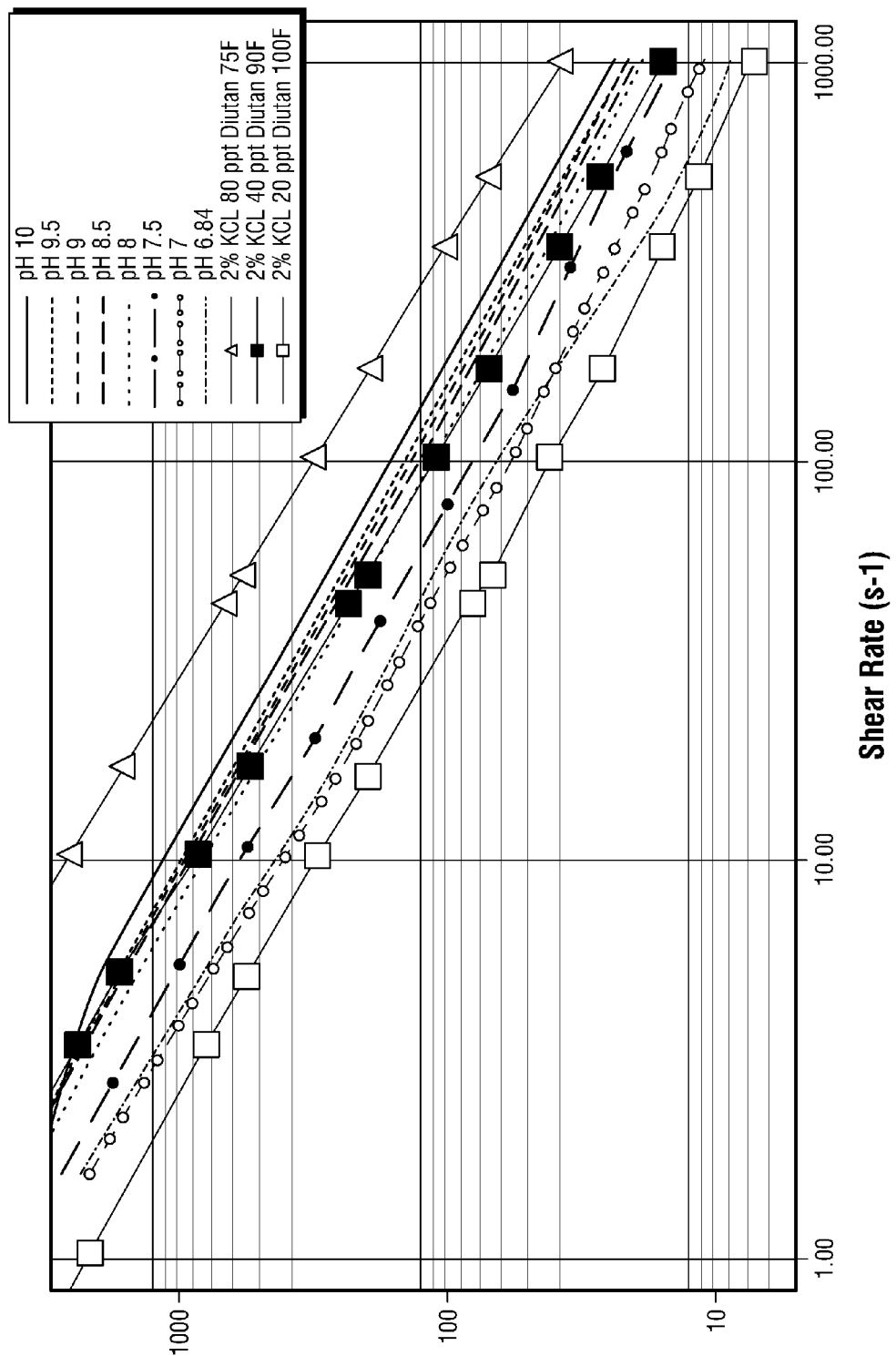

FIG. 5 shows the viscosity comparison of the 5% Catapal 200 Alumina dispersion and 20, 40, 60 and 80 pounds per thousand gallons ("pptg") diutan gum solutions. This shows that the alumina has rheological properties to suspend proppant since previous proppant settling tests have determined the 60 pptg diutan solution exhibits excellent proppant suspension properties. In addition, it illustrates the shear thinning properties of the formulations and shows that at relatively low shear, the dispersion can achieve relatively high viscosity.

Figure 6:
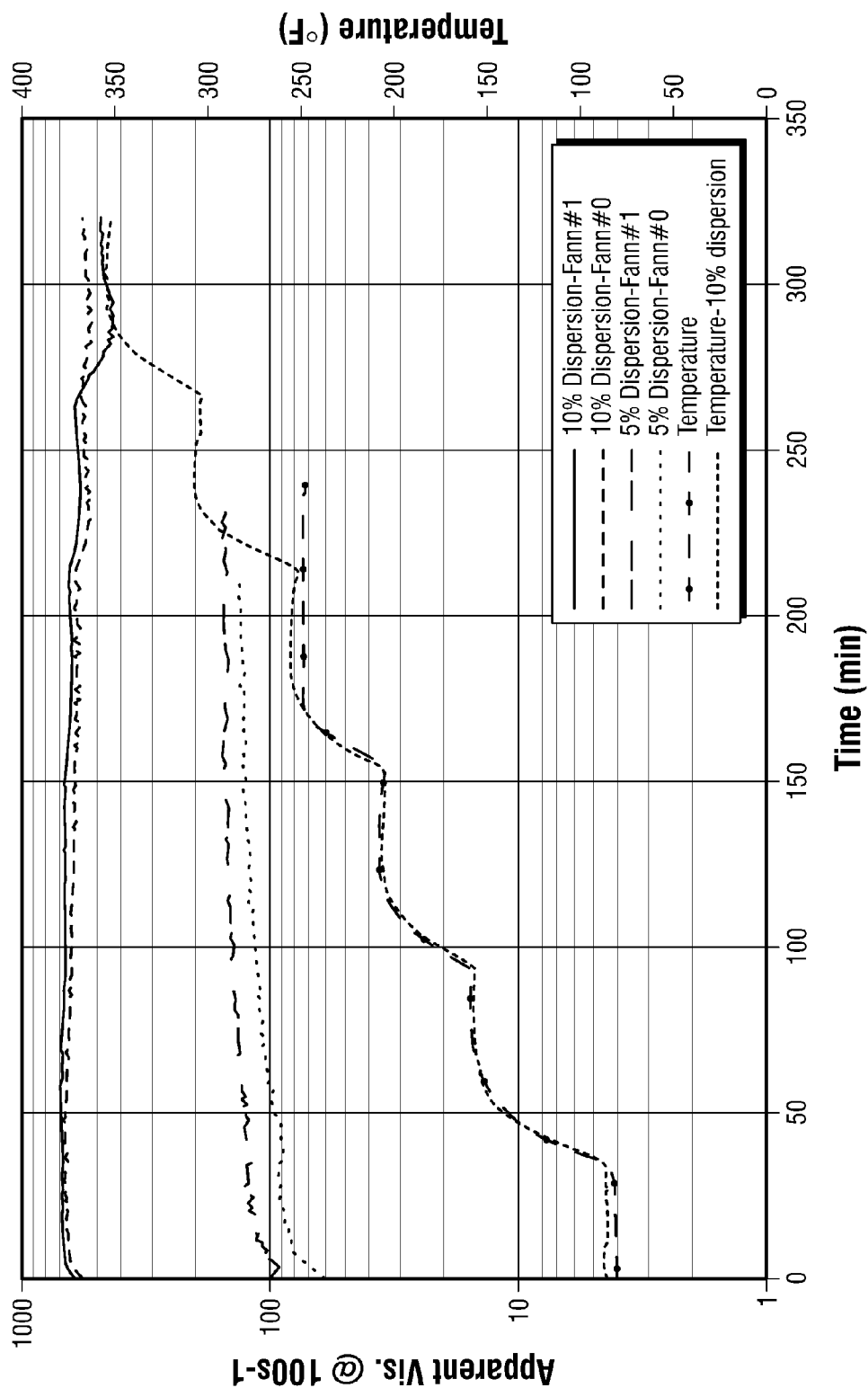

Fann 50 results of several of the 5% and 10% Catapal 200 Alumina dispersions of Formulations 3 to 9 with pH adjusted to 9.5 with 25% Caustic at temperatures between 75-350° F. are shown in FIG. 6. Results show that the 10% Catapal 200 Alumina dispersions are stable at temperatures up to 350° F. The fluid viscosity at 350° F. is approximately 500-600 cP at 100 s$^{-1}$. Results show that the 5% Catapal 200 Alumina dispersions are stable at temperatures up to at least 250° F. The fluid viscosity at 250° F. is approximately 50-60 cP at 100 s$^{-1}$.

Figure 7:
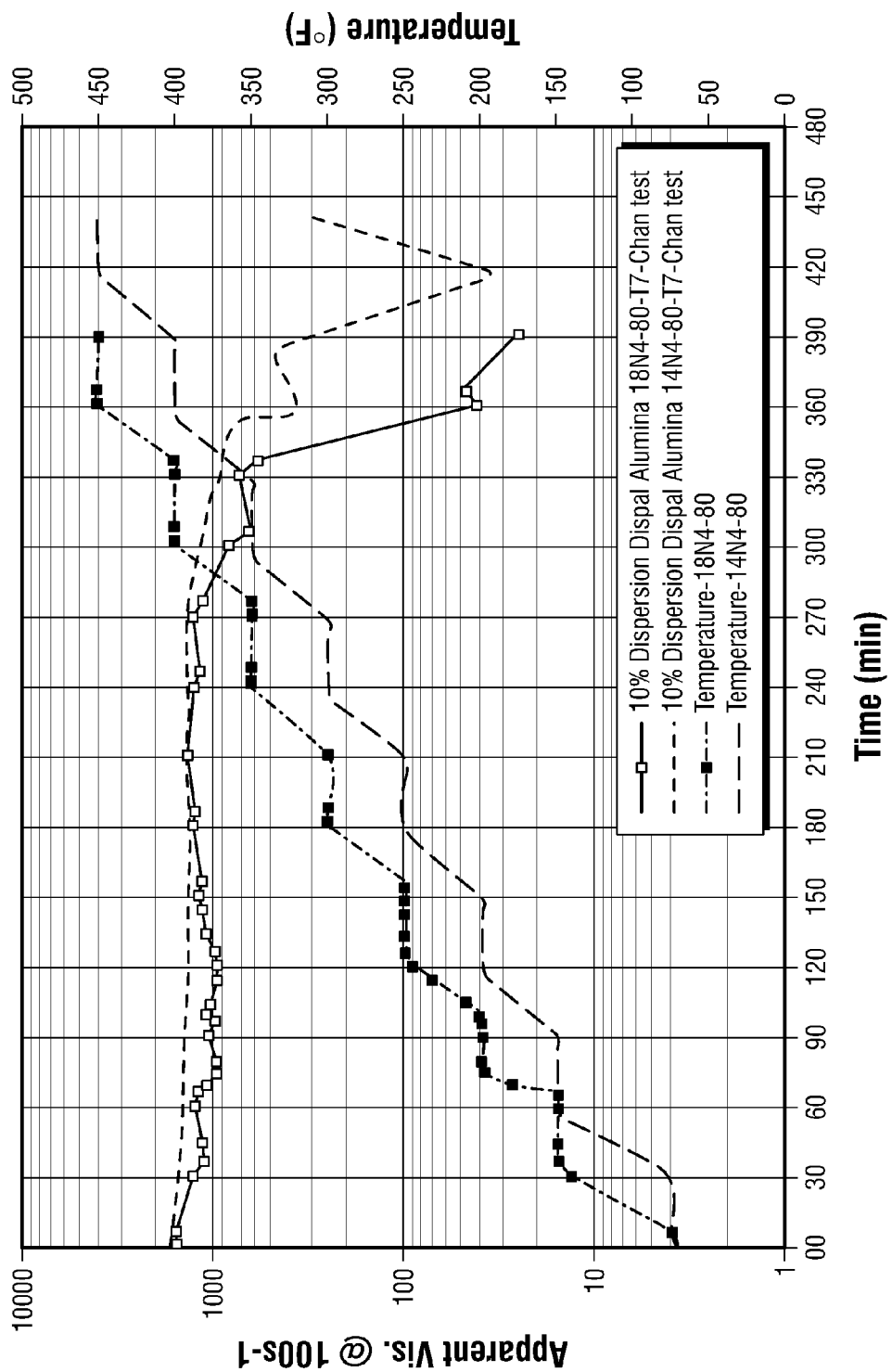

Fann 50 results of 10% Alumina dispersions with sample 18N4-80 and 14N4-80 at temperatures between 75-450° F. are shown in FIG. 7. Results suggest that both dispersions maintained viscosities of approximately 1000 cP at 100 s$^{-1}$ up to 350° F.

Figure 8:
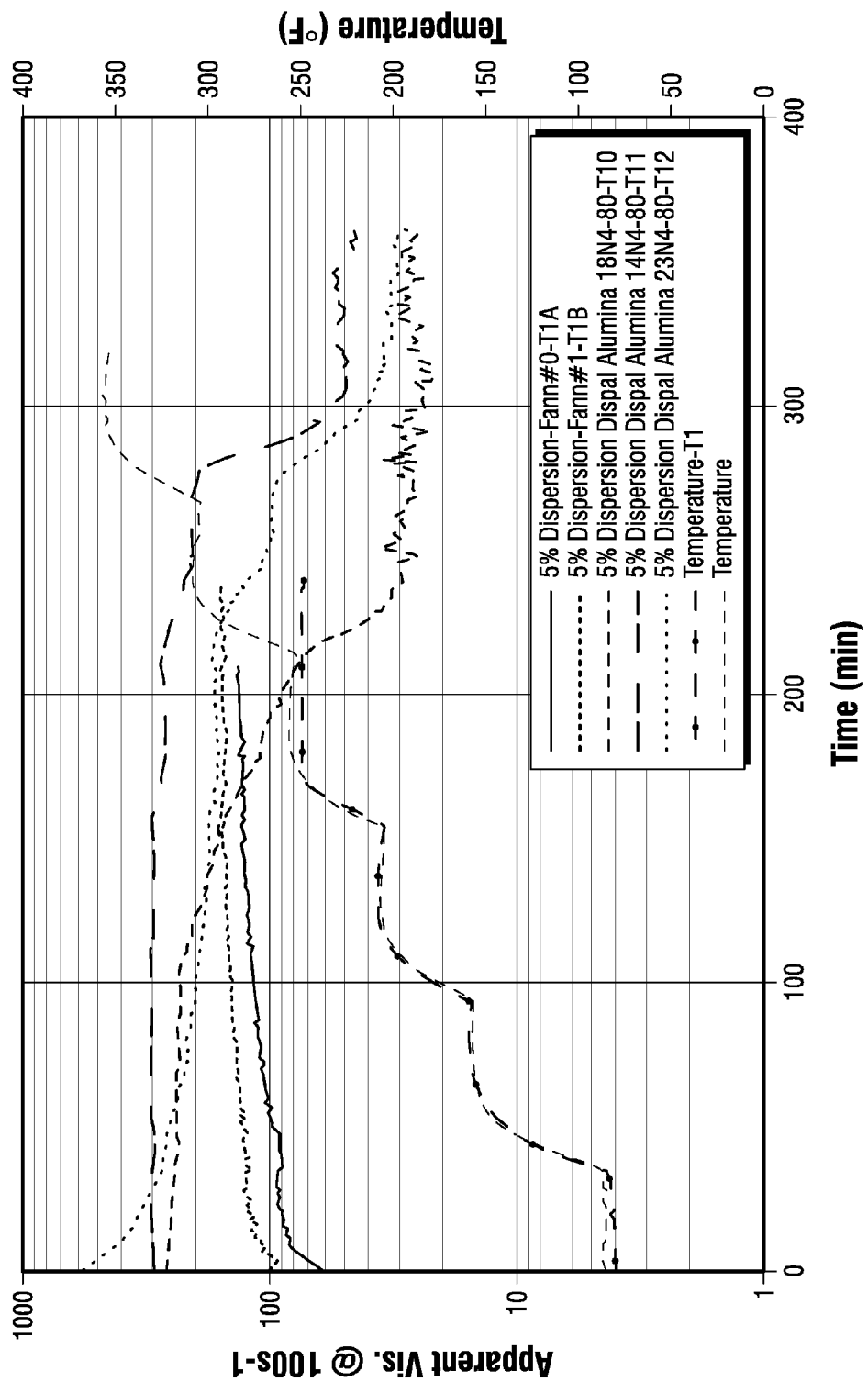

Fann 50 results of several 5% Alumina dispersions (14N4-80, 18N4-80, and 23N4-80) with pH adjusted to 9.5 with 25% Caustic at temperatures between 75-350° F. are shown in FIG. 8. Results suggest that all the Alumina dispersions, except for 18N4-80, maintained viscosities >100 cP at 100 s$^{-1}$ up to 250° F. The 5% dispersion with sample 18N4-80 showed reduced stability at temperature above 200° F.

Figure 9:
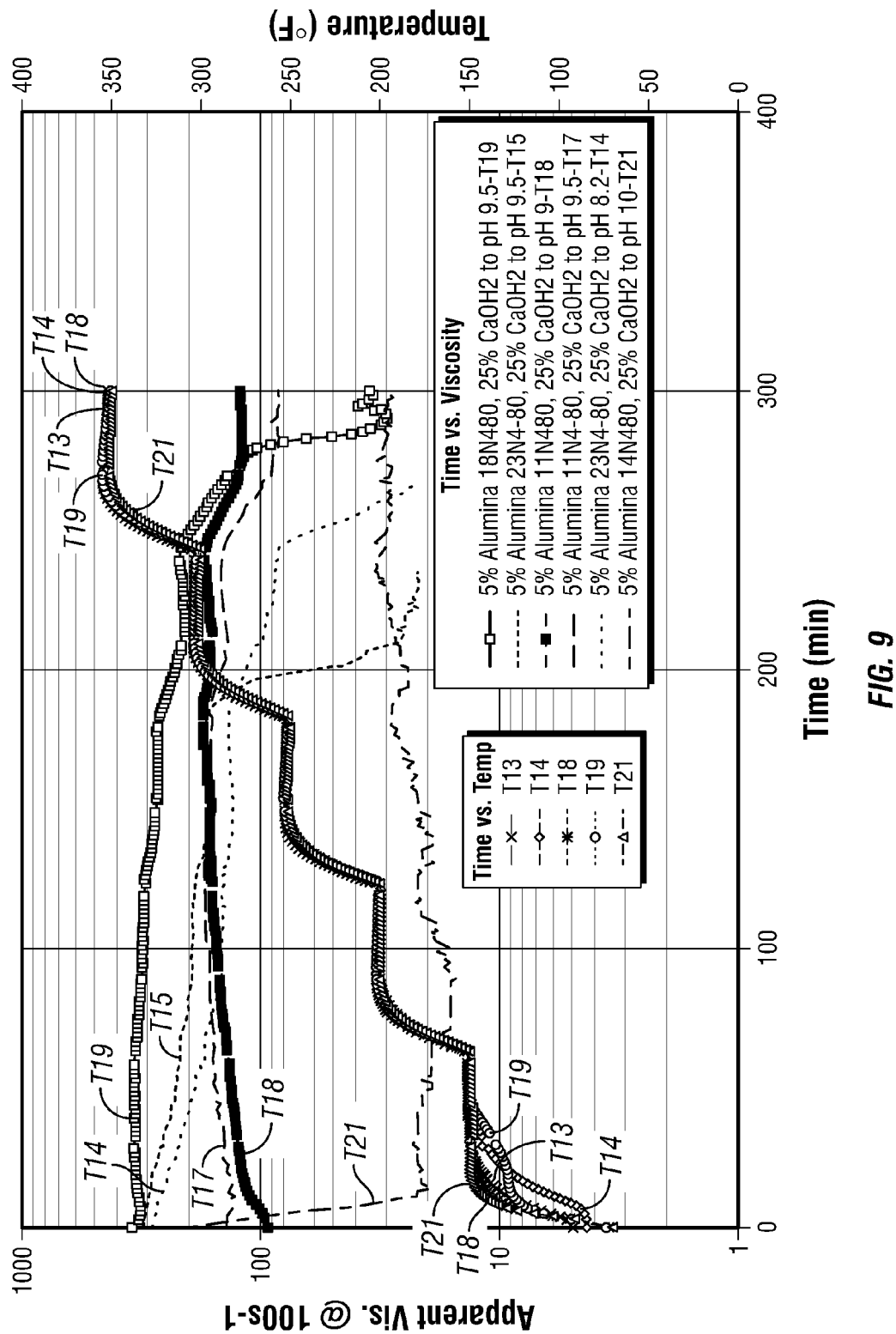

Fann 50 results of several 5% Alumina dispersions (11N4-80, 14N4-80, 18N4-80, and 23N4-80) with pH adjusted with 25% Ca(OH)$_2$ at temperatures between 75-350° F. are shown in FIG. 9. Results suggest that all the Alumina dispersions with the pH adjusted to 9.5, maintained viscosities >100 cP at 100 s$^{-1}$ up to 300° F. The 5% dispersion with sample 14N4-80 showed no stability at room temperature. The 5% dispersion with sample 11N4-80 maintained viscosity >100 cP at 100 s$^{-1}$ up to 350° F.

Sand Settling Tests
Formulation 10
Tomball tap water
5% Dispal Alumina 23N4-80
25% Caustic to pH of 9.5

In sand settling tests, 300 mL of a 5% Alumina 23N4-80 suspension was mixed using an overhead Servodyne mixer at 1500 RPM. 4 ppa of 20/40 brown sand was added to the suspension and the pH was adjusted to 9.5 with 25% Caustic. The suspension was poured into a 500 mL graduated cylinder and allowed to sit at room temperature.

To determine if any proppant settled out of the suspension, photographs (not shown) of the sample were then taken after 30 minutes, 1 hour, 2 hours, and 3 hours. Results of sand settling tests showed excellent proppant suspension of the sand up to 2 hours.

Contact Angle and Interfacial Tension Measurements

Contact angle and interfacial tension measurements were also taken for the 5% Alumina 14N4-80 dispersion. Results indicate that the contact angle on quartz was 21.0 degrees. This compares with a contact angle of water on quartz of 31.4 degrees. The surface tension for the 5% alumina 14N4-80 was 67.5 mN/m. The interfacial tension between the quartz and the 5% Alumina 14N4-80 was 0.29 mN/m. The low interfacial tension indicates that the fluid may provide improved fluid recovery.

What is claimed is:

1. A nano-dispersion well servicing fluid in a wellbore, the fluid being formulated with components comprising:
nanoparticles comprising at least one material chosen from aluminum oxides, aluminum hydroxides, aluminum hydroxyoxides, zirconium oxides, zirconium hydroxides, zirconium hydroxyoxides, the concentration of nanoparticles being greater than 0.5% by weight based on the total weight of the nano-dispersion well servicing fluid;

an aqueous base continuous phase, the nanoparticles forming a dispersion in the aqueous base continuous phase, the nanoparticles having a crystallized size of 100 nm or less in diameter prior to being dispersed, and the nanoparticles carrying a charge resulting in a Zeta potential in the nano-dispersion well servicing fluid; and a pH adjuster configured to decrease the Zeta potential of the nano-dispersion well servicing fluid in the wellbore closer to zero and thereby to increase viscosity, the nano-dispersion well servicing fluid exhibiting a viscosity greater than would be exhibited without the pH adjuster.

2. The fluid of claim 1, wherein the concentration of nanoparticles ranges from about 2% to about 20% by weight based on the total weight of the nano-dispersion well servicing fluid.

3. The fluid of claim 1, wherein the fluid does not comprise a viscoelastic surfactant gelling agent in an amount effective to significantly increase the viscosity of the fluid.

4. The fluid of claim 1, wherein the nanoparticles comprise more than 50 wt. % boehmite.

5. The fluid of claim 1, wherein the pH adjuster decreases Zeta potential by increasing pH.

6. The fluid of claim 1, having a Zeta potential ranging from about 0 to about 50.

7. The fluid of claim 1, having a pH ranging from about 2 to about 14.

8. The fluid of claim 1, further comprising at least one delayed compound chosen from pH adjusters, surfactants, and esters configured to increase Zeta potential after a delay and thereby to decrease viscosity.

9. The fluid of claim 1, wherein the pH adjuster is chosen from NaOH, KOH, $Ca(OH)_2$, sodium bicarbonate, potassium carbonate, and sodium carbonate.

10. The fluid of claim 8, wherein the at least one delayed compound is an ester of polycarboxylic acid.

11. The fluid of claim 1, further comprising proppant or gravel.

12. The fluid of claim 1, wherein the continuous phase is a liquid chosen from fresh water, brine, and produced water.

13. The fluid of claim 12, wherein the concentration of salt in the brine is 0.5% by weight or more, based on the total weight of the brine.

14. The fluid of claim 1, wherein the fluid is formulated with at least one breaker.

15. The fluid of claim 1, wherein the fluid is formulated with at least one additional compound chosen from water wetting surfactants, non-emulsifiers, additional viscosifying agents, surfactants, clay stabilization additives, scale dissolvers, biopolymer degradation additives, fluid loss control additives and high temperature stabilizers.

16. A nano-dispersion well servicing fluid in a wellbore, the fluid being formulated with components comprising:

nanoparticles comprising at least one material chosen from aluminum oxides, aluminum hydroxides, aluminum hydroxyoxides, zirconium oxides, zirconium hydroxides, zirconium hydroxyoxides, the concentration of nanoparticles being greater than 0.5% by weight based on the total weight of the nano-dispersion well servicing fluid;

an aqueous base continuous phase, the nanoparticles forming a dispersion in the aqueous base continuous phase, the nanoparticles having a crystallized size of 100 nm or less in diameter prior to being dispersed, and the nanoparticles carrying a charge resulting in a Zeta potential ranging from about 0 to about 50 in the nano-dispersion well servicing fluid; and a pH adjuster configured to decrease the Zeta potential of the nano-dispersion well servicing fluid in the wellbore closer to zero by increasing pH and thereby to increase viscosity, the nano-dispersion well servicing fluid exhibiting a viscosity greater than would be exhibited without the pH adjuster; and an ester configured to increase Zeta potential after a delay and thereby to decrease viscosity.

17. The fluid of claim 16, wherein the pH adjuster is chosen from NaOH, KOH, $Ca(OH)_2$, sodium bicarbonate, potassium carbonate, and sodium carbonate and the at least one delayed compound is an ester of polycarboxylic acid.

18. The fluid of claim 17, further comprising proppant or gravel.

* * * * *